(12) United States Patent
Ockenfuss (10) Patent No.: US 11,143,803 B2
(45) Date of Patent: Oct. 12, 2021

(54) MULTISPECTRAL FILTER

(71) Applicant: VIAVI Solutions Inc., San Jose, CA (US)

(72) Inventor: Georg J. Ockenfuss, Santa Rosa, CA (US)

(73) Assignee: VIAVI Solutions Inc., San Jose, CA (US)

( * ) Notice: Subject to any disclaimer, the term of this patent is extended or adjusted under 35 U.S.C. 154(b) by 135 days.

(21) Appl. No.: 16/049,391

(22) Filed: Jul. 30, 2018

(65) Prior Publication Data

US 2020/0033520 A1    Jan. 30, 2020

(51) Int. Cl.
*G02B 5/28* (2006.01)
*G01J 3/02* (2006.01)

(52) U.S. Cl.
CPC ............ *G02B 5/281* (2013.01); *G01J 3/0229* (2013.01)

(58) Field of Classification Search
CPC ................................ G02B 5/281; G01J 3/0229
See application file for complete search history.

(56) References Cited

U.S. PATENT DOCUMENTS

| | | | | |
|---|---|---|---|---|
| 6,631,033 | B1* | 10/2003 | Lewis | G02B 5/288 359/580 |
| 6,850,366 | B2* | 2/2005 | Hendrix | G02B 5/288 359/578 |
| 9,960,199 | B2* | 5/2018 | Ockenfuss | G02B 5/285 |
| 2004/0080830 | A1 | 4/2004 | Leu et al. | |

| | | | | |
|---|---|---|---|---|
| 2007/0125934 | A1* | 6/2007 | Matthews | H01L 31/09 250/208.1 |
| 2008/0042782 | A1 | 2/2008 | Wang et al. | |
| 2012/0129269 | A1* | 5/2012 | Choi | G01J 3/02 436/164 |
| 2014/0210031 | A1* | 7/2014 | Hendrix | G02B 5/288 257/432 |
| 2014/0267878 | A1* | 9/2014 | Geelen | G01J 3/0264 348/342 |
| 2015/0233762 | A1* | 8/2015 | Goldring | G01J 3/10 356/451 |

(Continued)

FOREIGN PATENT DOCUMENTS

| | | |
|---|---|---|
| EP | 3495789 A1 | 6/2019 |
| WO | 9936811 A1 | 7/1999 |
| WO | 0063728 A1 | 10/2000 |

OTHER PUBLICATIONS

Extended European Search Report for Application No. EP19188434. 5, dated Mar. 13, 2020, 13 pages.

(Continued)

*Primary Examiner* — Collin X Beatty
(74) *Attorney, Agent, or Firm* — Harrity & Harrity, LLP (57) ABSTRACT

An optical filter may include a substrate, a first mirror that includes a first subset of layers of a set of layers, and a second mirror that includes a second subset of layers of the set of layers. The optical filter may include a spacer. The spacer may include a third subset of layers of the set of layers. The set of layers may include a plurality of high refractive index layers associated with a first refractive index and a plurality of low refractive index layers associated with a second refractive index that is less than the first refractive index. The optical filter may be associated with a spectral range from at least approximately 1200 nanometers (nm) to approximately 1900 nm.

18 Claims, 6 Drawing Sheets

(56) References Cited

U.S. PATENT DOCUMENTS

2016/0238759 A1* 8/2016 Sprague .................. C23C 14/14
2017/0123122 A1* 5/2017 Ballif ...................... G02B 5/26
2017/0234726 A1   8/2017 Ockenfuss
2019/0297278 A1* 9/2019 Sumi ....................... G02B 5/20
2019/0377109 A1* 12/2019 Frey .................. H01L 27/14621

OTHER PUBLICATIONS

Partial European Search Report for Application No. EP19188434.5, dated Dec. 9, 2019, 15 pages.

* cited by examiner

MULTISPECTRAL FILTER

BACKGROUND

Optical sensors are used in a variety of devices, such as image sensors, ambient light sensors, proximity sensors, hue sensors, and ultraviolet (UV) sensors, and/or the like to convert optical signals into electrical signals, thereby allowing detection of optical signals or image capture. A multispectral sensor device may be utilized to capture information regarding multiple wavelengths of light. For example, the multispectral sensor device may capture information relating to a particular set of electromagnetic frequencies. The multispectral sensor device may include a set of sensor elements (e.g., optical sensors, spectral sensors, and/or image sensors) that capture the information. For example, an array of sensor elements may be utilized to capture information relating to multiple frequencies. A particular sensor element, of the sensor element array, may be associated with a filter that restricts a range of frequencies that are directed toward the particular sensor element. Such filters may be used for increasing spectral ranges as use cases require increasing ranges of spectra for sensing.

SUMMARY

According to some possible implementations, an optical filter may include a substrate, a first mirror that includes a first subset of layers of a set of layers, and a second mirror that includes a second subset of layers of the set of layers. The optical filter may include a spacer. The spacer may include a third subset of layers of the set of layers. The set of layers may include a plurality of high refractive index layers associated with a first refractive index and a plurality of low refractive index layers associated with a second refractive index that is less than the first refractive index. The optical filter may be associated with a spectral range from at least approximately 1200 nanometers (nm) to approximately 1900 nm.

According to some possible implementations, a binary multispectral filter may include a plurality of layers, wherein the plurality of layers includes a set of high refractive index layers associated with a first refractive index and a set of low refractive index layers associated with a second refractive index that is less than the first refractive index, wherein the plurality of layers form a plurality of channels to direct a plurality of wavelengths of light, and wherein the set of high refractive index layers include at least one of: a hydrogenated silicon layer, a silicon germanium layer, a germanium layer, a hydrogenated silicon germanium layer, or a hydrogenated germanium layer.

According to some possible implementations, a system may include a set of optical sensors disposed in a substrate and a multispectral filter deposited on the substrate. The multispectral filter may include a first set of layers and a second set of layers sandwiching one or more spacer layers, wherein the first set of layers and the second set of layers include alternating high refractive index layers with a first refractive index and low refractive index layers with a second refractive index less than the first refractive index, wherein a material, a thickness, and a quantity of the high refractive index layers and the low refractive index layers are selected to form a set of channels corresponding to the set of optical sensors and to cause a threshold spectral width for the set of channels.

DETAILED DESCRIPTION

The following detailed description of example implementations refers to the accompanying drawings. The same reference numbers in different drawings may identify the same or similar elements.

A sensor element (e.g., an optical sensor) may be incorporated into an optical sensor device to obtain information (e.g., spectral data) regarding a set of electromagnetic frequencies. For example, the optical sensor device may include an image sensor, a multispectral sensor, and/or the like that may perform a sensor measurement of light directed toward the optical sensor device. The optical sensor device may utilize one or more sensor technologies, such as a complementary metal-oxide-semiconductor (CMOS) technology, a charge-coupled device (CCD) technology, and/or the like. The optical sensor device may include multiple sensor elements (e.g., an array of sensor elements—referred to as a sensor element array) each configured to obtain information. For example, a sensor element array may include multiple sensor elements configured to obtain information regarding multiple corresponding frequencies. Additionally, or alternatively, a sensor element array may include multiple sensor elements configured to obtain information associated with a single frequency.

A sensor element may be associated with a filter that filters light to the sensor element. For example, the sensor element may be aligned with a linear variable filter (LVF), a circular variable filter (CVF), a Fabry-Perot filter, a binary multispectral filter, and/or the like to cause a portion of light directed toward the sensor element to be filtered. For a binary filter structure, such as a Fabry-Perot filter, a binary multispectral filter, and/or the like, silicon may be selected for layers of a spacer that is positioned between mirrors of the binary filter structure. Silicon (Si) is associated with a relatively high refractive index in the near-infrared (NIR) spectral range. The mirrors of the binary filter structure may each include a set of alternating layers of a high refractive index (e.g., greater than a threshold refractive index) material and a low refractive index (e.g., less than or equal to the threshold refractive index) material. For example, silicon may be selected for the high refractive index material, and another material, such as silicon dioxide ($SiO_2$) may be selected for the low refractive index material.

However, silicon may be associated with a limited spectral range. For example, for a 64 channel sensor element array, a spectral range of only 1100 nanometers (nm) to 1900 nm may be covered using a silicon based multispectral filter. This may result in a limited spectral range for which a sensor element array may obtain information, thereby preventing the sensor element array from providing information for a particular functionality that uses spectral information associated with another spectral range, such as gesture recognition, object recognition, spectroscopic measurement, and/or the like.

Some implementations, described herein, provide a binary multispectral filter with an improved spectral range relative to optical filters that use silicon for a high refractive index material. For example, a binary multispectral filter may use, for the high refractive index material, hydrogenated silicon (Si:H), silicon germanium (SiGe), germanium (Ge), hydrogenated germanium (Ge:H), hydrogenated silicon germanium (SiGe:H), a combination thereof, and/or the like. In this way, the binary multispectral filter may enable an increased spectral range relative to other filters. For example, the binary multispectral filter may enable a spectral range from approximately 1200 nm to approximately 1800 nm, from approximately 700 nm to approximately 1100 nm, from approximately 1100 nm to approximately 2000 nm, from approximately 1000 nm to approximately 2200 nm, a combination of ranges thereof, and/or the like. In this way, the binary multispectral filter may enable a system to perform sensing for the near-infrared (NIR) spectral range, the short-wave infrared (SWIR) spectral range, and/or the like.

Moreover, based on using materials with increased indices of refraction relative to silicon for the high refractive index material, some implementations, described herein, may provide a multispectral filter with reduced spectral shift with an increase in angle of incidence. Furthermore, based on enabling a multispectral filter for the NIR spectral range and/or the SWIR spectral range, some implementations, described herein, may enable biometric systems or security systems (e.g., fingerprint detection, retinal scanning, facial recognition, etc.), health monitoring systems (e.g., pulse detection, blood oxygenation detection), object identification systems, gesture identification systems, spectroscopic identification systems, and/or the like.

Figure 1:
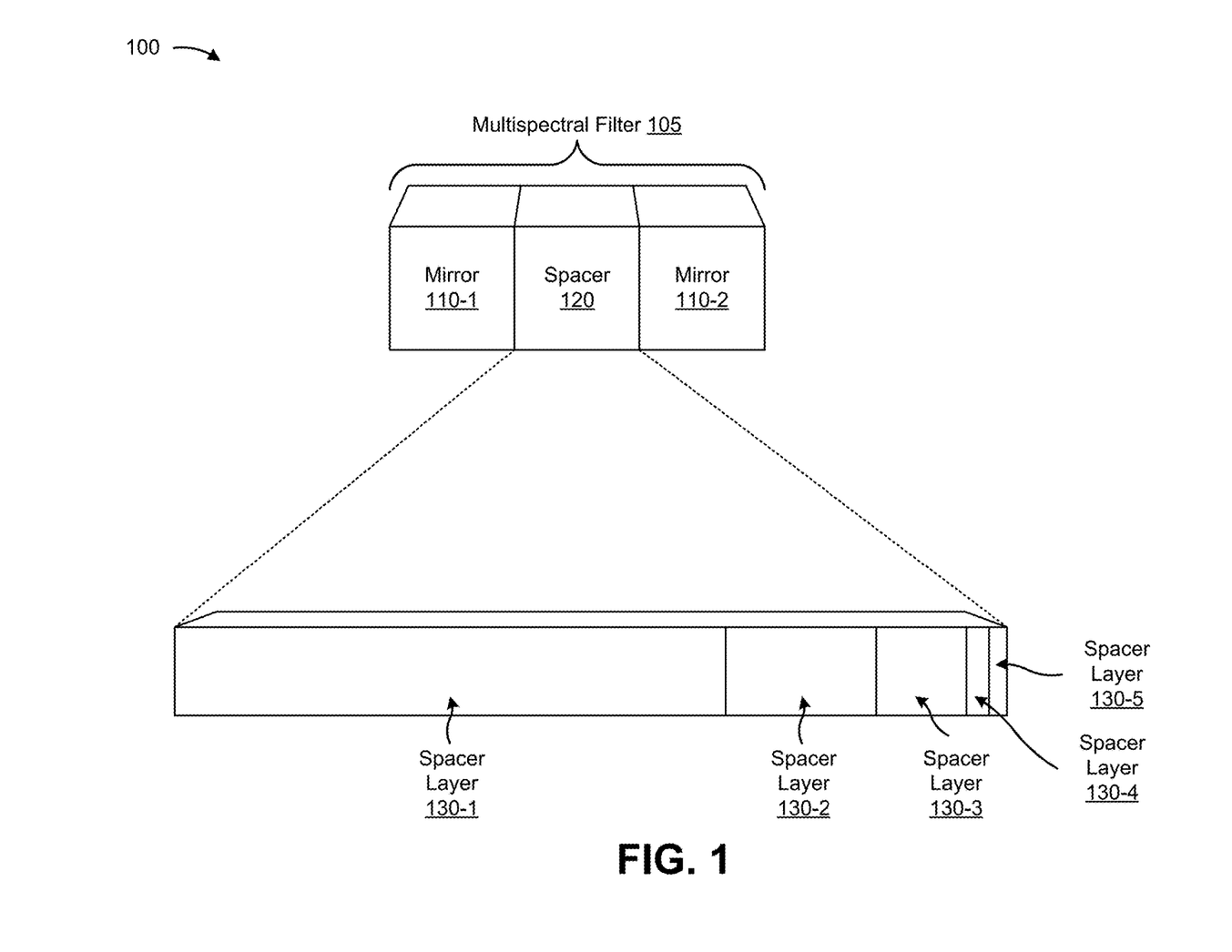
FIG. 1 is a diagram of an example implementation described herein.

FIG. 1 is a diagram of an example implementation 100 described herein. As shown in FIG. 1, a multispectral filter 105 (e.g., a binary structure optical filter array) may include a first mirror 110-1, a second mirror 110-2, and a spacer 120.

As further shown in FIG. 1, first mirror 110-1 and second mirror 110-2 may sandwich spacer 120. In other words, spacer 120 may separate first mirror 110-1 and second mirror 110-2 by a threshold distance, and/or faces of spacer 120 may be enclosed by first mirror 110-1 and second mirror 110-2. In some implementations, mirrors 110 may be associated with a particular material. For example, mirrors 110 may include a set of hydrogenated silicon layers, hydrogenated germanium layers, silicon germanium layers, hydrogenated silicon germanium layers, and/or the like to reflect a portion of light directed from a light source toward sensor elements associated with multispectral filter 105. Mirrors 110 may align with each sensor element of a sensor element array associated with each channel of multispectral filter 105.

In some implementations, spacer 120 may include one or more spacer layers 130. For example, spacer 120 may include a set of spacer layers 130-1 through 130-5 (e.g., dielectric layers, such as hydrogenated silicon layers, hydrogenated germanium layers, silicon germanium layers, hydrogenated silicon germanium layers, and/or the like). In some implementations, spacer 120 may be associated with a single cavity configuration. In some implementations, spacer 120 may be associated with a multi-cavity configuration.

In some implementations, a thickness of one or more spacer layers 130 may be related based on a binary progression. For example, spacer layer 130-3 may be associated with a thickness of approximately half a thickness of spacer layer 130-2, spacer layer 130-4 may be associated with a thickness of approximately half the thickness of spacer layer 130-3, and spacer layer 130-5 may be associated with a thickness of approximately half the thickness of spacer layer 130-4.

In some implementations, multispectral filter 105 may be deposited onto a substrate associated with an optical sensor device. For example, mirror 110-1 may be deposited (e.g., via a deposition process and/or a photolithographic lift-off process) onto a substrate that includes an array of sensor elements to capture information (e.g., spectral data). In some implementations, spacer 120 may permit capture of information relating to multiple wavelengths. For example, a first portion of spacer 120 aligned with a first sensor element (e.g., a back illuminated optical sensor or a front illuminated optical sensor of a sensor element array) may be associated with a first thickness and a second portion of spacer 120 aligned with a second sensor element may be associated with a second thickness. In this case, light, which is directed toward the first sensor element and the second sensor element, may correspond to a first wavelength at the first sensor element based on the first thickness and a second wavelength at the second sensor element based on the second thickness.

As indicated above, FIG. 1 is provided merely as an example. Other examples are possible and may differ from what was described with regard to FIG. 1.

Figure 2:
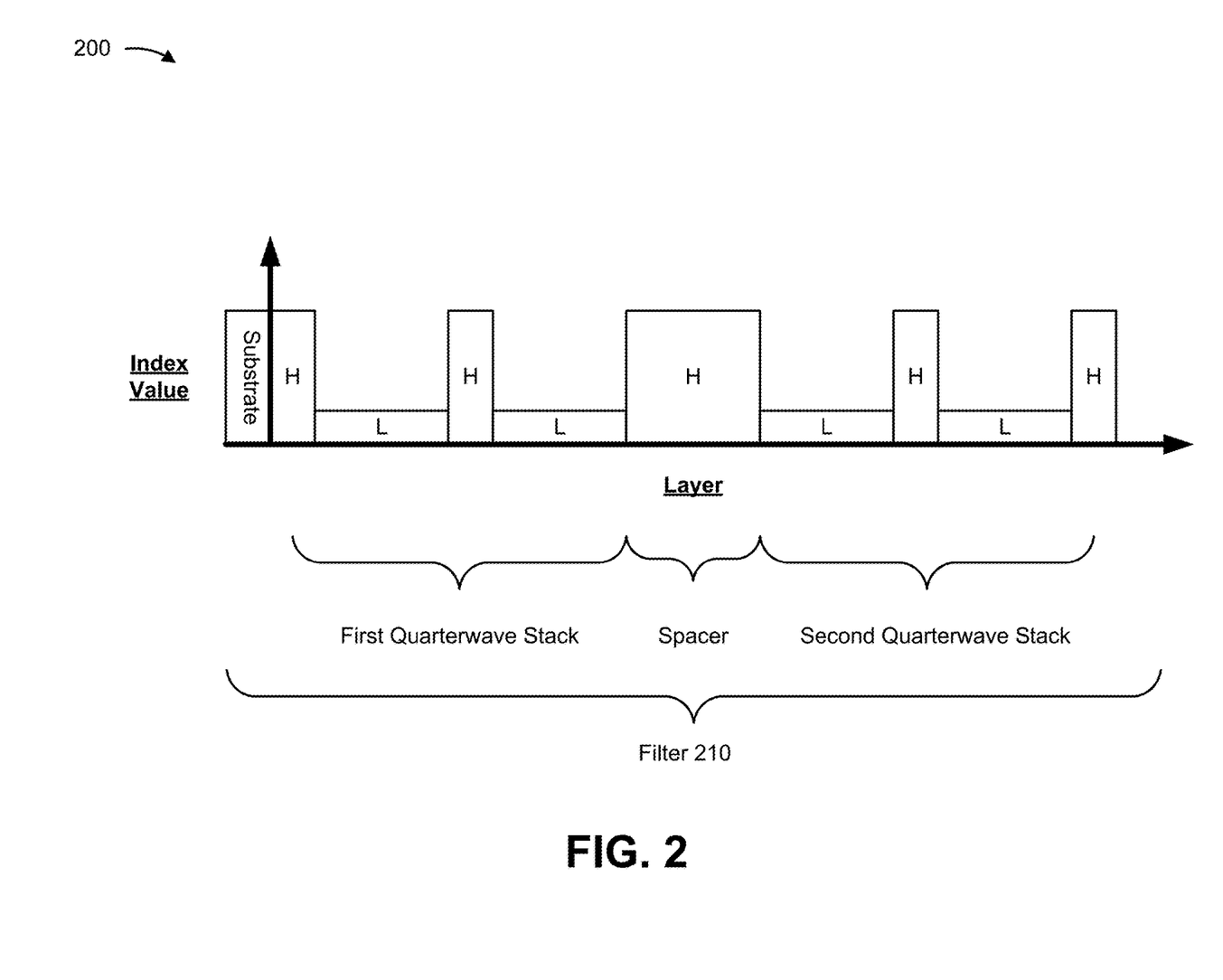
FIG. 2 is a diagram of an example of a binary multispectral filter described herein.

FIG. 2 is a diagram of an example of a binary multispectral (Fabry-Perot) filter using two quarterwave stacks of high refractive index/low refractive index (HL) pairs.

As shown in FIG. 2, and by chart 200, a filter 210 may include a substrate, a first quarterwave stack including alternating high refractive index (H) layers and low refractive index (L) layers, a high refractive index spacer, and a second quarterwave stack including alternating high refractive index layers and low refractive index layers. In some implementations, the first quarterwave stack and the second quarterwave stack form a first mirror and a second mirror to sandwich the high refractive index spacer. For example, the first quarterwave stack and the second quarterwave stack may completely cover the high refractive index spacer. Alternatively, the first quarterwave stack and the second quarterwave stack may partially cover the high refractive index spacer. In some implementations, filter 210 may include one or more other layers to provide one or more other functionalities. For example, filter 210 may include one or more blocker layers to block a particular wavelength of light, one or more anti-reflectance layers, one or more protective layers to reduce environmental degradation of the quarterwave stacks, and/or the like.

In some implementations, filter 210 may include greater than two quarterwave stacks. For example, filter 210 may include a first quarterwave stack and a second quarterwave stack forming a first mirror and a third quarter wave stack and a fourth quarterwave stack forming a second mirror. Similarly, filter 210 may include mirrors formed from three quarterwave stacks, four quarterwave stacks, and/or the like. In some implementations, each quarterwave stack may be a same set of materials. For example, each quarterwave stack may include a particular high refractive index material and a particular low refractive index material. Alternatively, a first quarterwave stack may include a first high refractive index material and a first low refractive index material and a second quarterwave stack may include a second high refractive index material and a second low refractive index material. In some implementations, each mirror may include a same quantity of quarterwave stacks. For example, a first mirror may include the first quarterwave stack and a second mirror may include the second quarterwave stack. Alternatively, the first mirror may include a set of two quarterwave stacks and the second mirror may include a set of three quarterwave stacks. In some implementations, a quantity, composition, arrangement, and/or the like of layers and/or quarterwave stacks in filter 210 may be selected to configure a particular bandwidth, angle shift, transmissivity, spectral range, and/or the like for filter 210.

In some implementations, the high refractive index layers of the first quarterwave stack and/or the second quarterwave stack may each be associated with a refractive index of greater than approximately 3.0, greater than approximately 3.5, greater than approximately 3.6, greater than approximately 3.7, greater than approximately 3.8, greater than approximately 3.9, greater than approximately 4.0, and/or the like. In some implementations, the high refractive index layers may be a single material, such as silicon, silicon germanium, germanium, hydrogenated silicon, hydrogenated silicon germanium, hydrogenated germanium, and/or the like. In some implementations, the high refractive index layers may include multiple materials, such as a combination of hydrogenated silicon layers and hydrogenated silicon germanium layers.

In some implementations, the high refractive index layers of the first quarterwave stack and/or the second quarterwave stack may each be associated with a physical thickness of between approximately 40 nm and approximately 300 nm, between approximately 60 nm and approximately 180 nm, between approximately 70 nm and approximately 90 nm, approximately 78 nm, and/or the like. In some implementations, the high refractive index layers of the first quarterwave stack and the second quarterwave stack may each be associated with a quarterwave optical thickness of between approximately 75 nm and approximately 500 nm, between approximately 120 nm and approximately 300 nm, between approximately 180 nm and approximately 250 nm, approximately 230 nm, and/or the like. Quarterwave optical thickness of a layer corresponds to the physical thickness and refractive index of the layer, as described herein.

The low refractive index layers of the first quarterwave stack and the second quarterwave stack may each be associated with a refractive index of less than approximately 2.5, less than approximately 2.0, less than approximately 1.5, and/or the like. In some implementations, a difference between a first refractive index of the high refractive index layers and a second refractive index of the low refractive index layers may be greater than approximately 1.5, greater than approximately 2.0, greater than approximately 2.5, and/or the like. For example, the low refractive index layers may include a set of silicon dioxide ($SiO_2$) layers, a set of aluminum oxide ($Al_2O_3$) layers, a set of titanium dioxide ($TiO_2$) layers, a set of niobium pentoxide ($Nb_2O_5$) layers, a set of tantalum pentoxide ($Ta_2O_5$) layers, a set of magnesium fluoride ($MgF_2$) layers, a set of silicon nitride ($S_3N_4$) layers, zirconium oxide ($ZrOz_2$), yttrium oxide ($Y_2O_3$), and/or the like.

In some implementations, the low refractive index layers of the first quarterwave stack and the second quarterwave stack may each be associated with a range of physical thicknesses based on a wavelength range that is to be covered and a refractive index that of a material that is used. For example, a thickness of approximately 231 nm and/or the like may be used for the low refractive index layers and/or the quarterwave stacks formed therefrom. In some implementations, the low refractive index layers of the first quarterwave stack and the second quarterwave stack may each be associated with a quarterwave optical thickness of approximately 1100 to approximately 2000 nm, approximately 1200 to approximately 1600 nm, approximately 1350 nm, and/or the like.

The high refractive index spacer layer is associated with a physical thickness of approximately 78 nm, and a quarterwave optical thickness of approximately 1350 nm. In some implementations, the high refractive index spacer layer may be a same material as the high refractive index layers, a different material than the high refractive index layers, a combination of a same and a different material, and/or the like. In some implementations, a refractive index, a thickness, a quantity, and/or the like of layers of filter 210 may be selected to cause filter 210 to provide a threshold quantity of channels (e.g., at least 32 channels, at least 64 channels, at least 128 channels, and/or the like), a threshold spectral width as described herein, a threshold channel width as described herein, a threshold transmissivity, and/or the like.

In some implementations, filter 210 may be fabricated using a sputtering procedure. For example, filter 210 may be fabricated using a pulsed-magnetron based sputtering procedure to sputter alternating layers on a glass substrate, a silicon substrate, or another type of substrate. In some implementations, multiple cathodes may be used for the sputtering procedure, such as a first cathode to sputter silicon and a second cathode to sputter germanium.

In some implementations, filter 210 may be annealed using one or more annealing procedures, such as a first annealing procedure at a temperature of approximately 280 degrees Celsius or between approximately 200 degrees Celsius and approximately 400 degrees Celsius, a second annealing procedure at a temperature of approximately 320 degrees Celsius or between approximately 250 degrees Celsius and approximately 350 degrees Celsius, and/or the like.

Although described herein as a high refractive index spacer layer, the high refractive index spacer layer may include multiple spacer layers of a particular material and of multiple thicknesses selected to form multiple channels. For example, in a first case, the high refractive index spacer layer may be formed using multiple layers to form 64 channels. Similarly, in a second case, the high refractive index spacer layer may be formed using multiple layers to form 128 channels.

As indicated above, FIG. 2 is provided merely as an example. Other examples are possible and may differ from what was described with regard to FIG. 2.

FIGS. 3A-3D are diagrams of example optical characteristics of a binary multispectral (e.g., a Fabry-Perot) filter using one or more selected materials for high refractive index layers, such as a filter 210, described with regard to FIG. 2A.

Figure 3A:
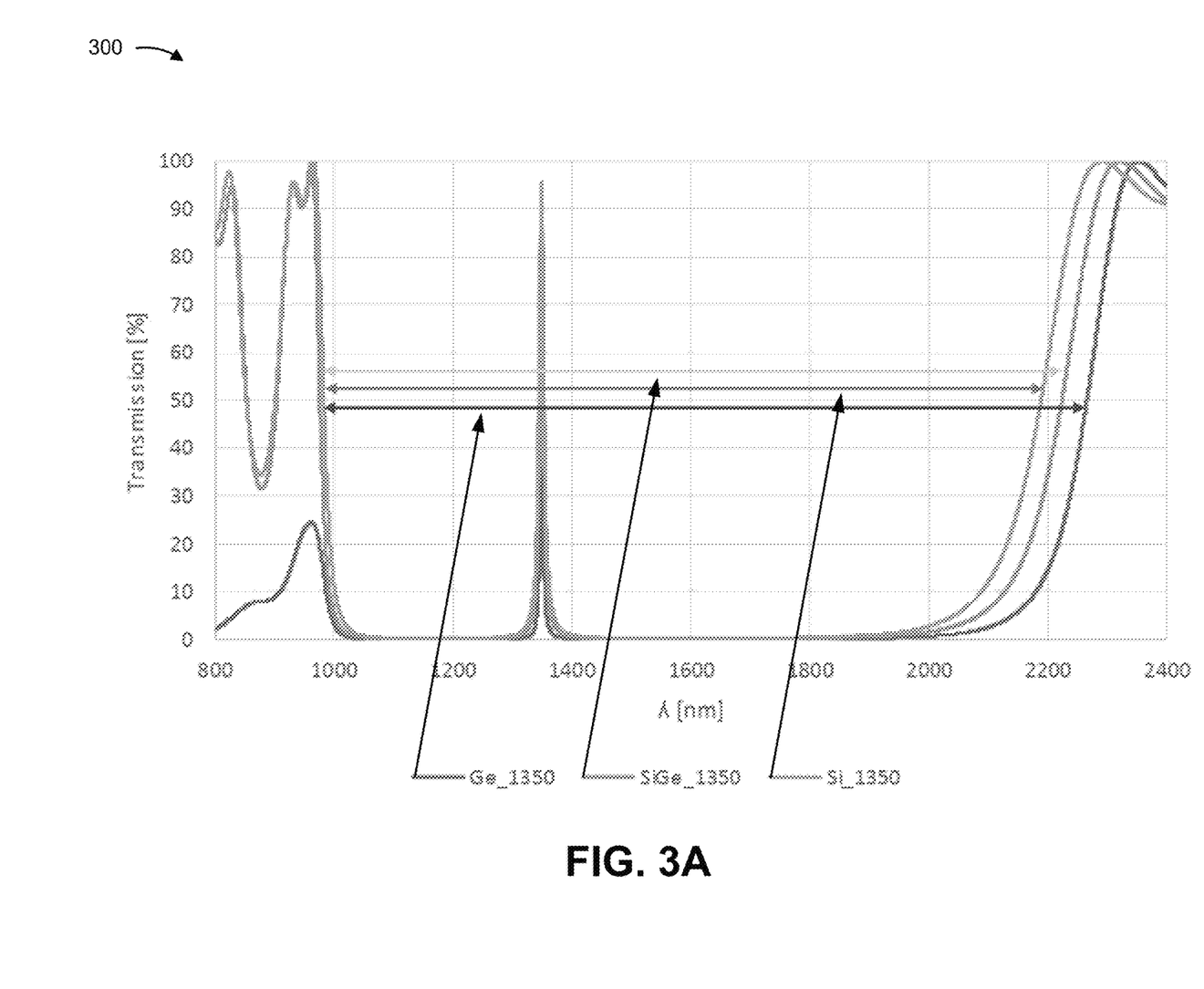
FIGS. 3A-3D are diagrams of example characteristics relating to a binary multispectral filter described herein.

As shown in FIG. 3A, and by chart 300, a spectral bandwidth is determined for a channel using a particular material for a high refractive index layer of a binary multispectral filter described herein. For example, for a channel centered at approximately 1350 nm, use of silicon results in a spectral width from approximately 980 nm to approximately 2180 nm at a transmissivity of 50% and a spectral width from approximately 960 nm to approximately 2250 nm at a peak transmissivity of approximately 95%. In contrast, use of silicon germanium results in a spectral width from approximately 975 nm to approximately 2250 nm at a transmissivity of 50% and a spectral width from approximately 955 nm to approximately 2275 nm at a peak transmissivity of approximately 95%. In this way, use of silicon germanium for high refractive index layers results in an increase to a spectral width, thereby improving performance of the binary multispectral filter.

Furthermore, use of germanium results in a reduction of transmissivity at approximately 980 nm to less than approximately 25%, a 50% transmissivity is occurs at 2275 nm, and a peak transmissivity occurs at 2300 nm. In this way, use of germanium for high refractive index layers results in an increase to a spectral width and/or obviates a need for a blocker to block transmissivity at less than 1000 nm, thereby improving performance of a binary multispectral filter, reducing manufacturing complexity, reducing cost, and/or reducing size relative to use of other filter materials. Based on improving a spectral width for a multispectral filter, the multispectral filter may be configured for a greater quantity of channels, a greater range of bandwidths, and/or the like, which may improve sensing, such as for object sensing, object recognition, medical device sensing, biometric sensing, and/or the like.

Figure 3B:
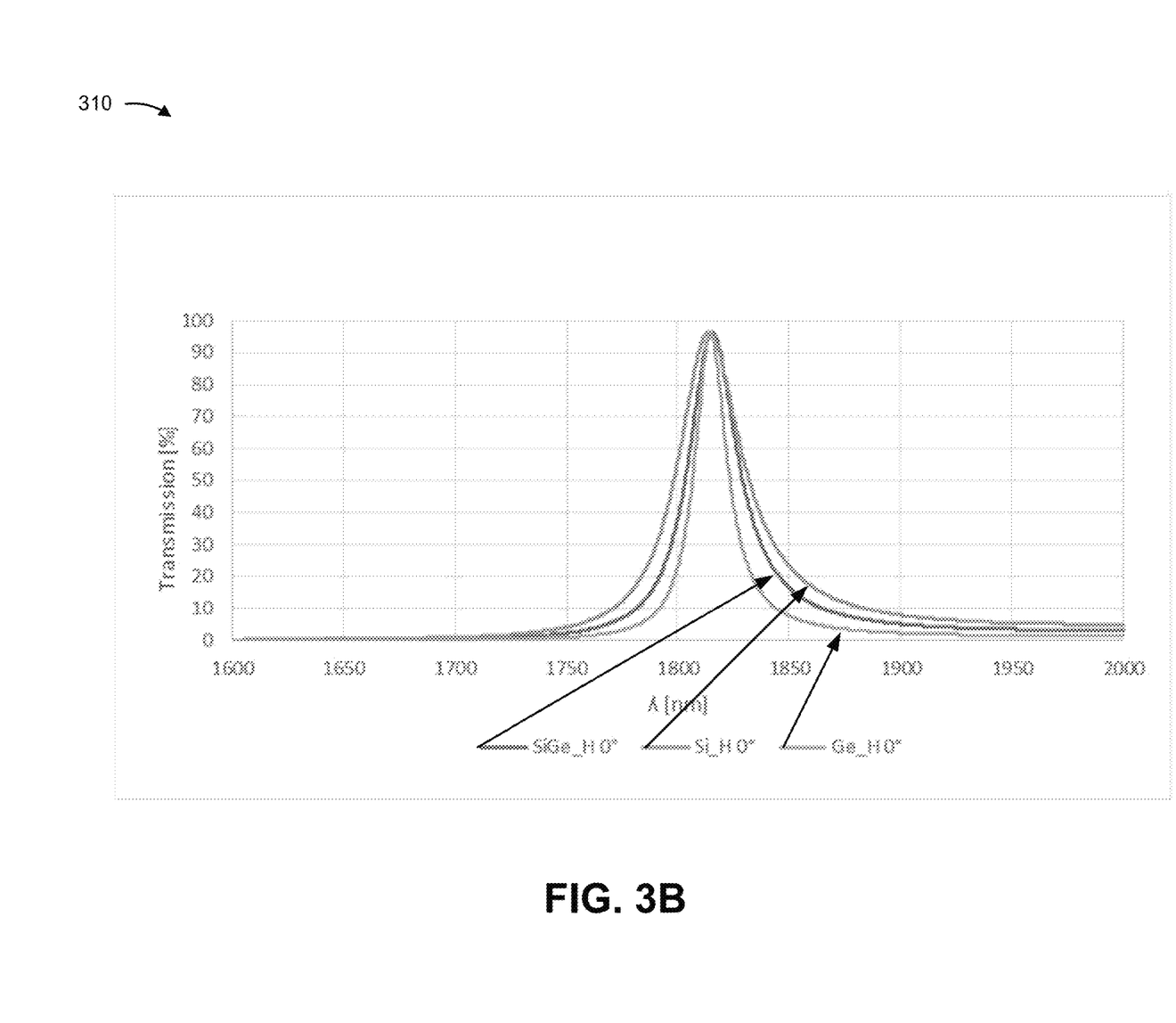

As shown in FIG. 3B, and by chart 310, a spectral bandwidth is determined for a channel at 1800 nm and at an angle of incidence of 0 degrees using a particular material for a high refractive index layer of a binary multispectral filter described herein. For example, for hydrogenated silicon based high refractive index layer a peak of approximately 95% transmissivity may be achieved, and a spectral width for 50% transmissivity may extend from 1795 nm to 1835 nm.

In contrast, for a hydrogenated silicon germanium based high refractive index layer, a peak of approximately 95% transmissivity may be achieved, and a spectral width for 50% transmissivity may extend from 1805 nm to 1830 nm. In contrast, for a hydrogenated germanium based high refractive index layer a peak of approximately 95% transmissivity may be achieved, and a spectral width for 50% transmissivity may extend from 1810 nm to 1825 nm. In this way, use of hydrogenated germanium may result in a narrower spectral width for a channel, thereby improving filter performance relative to another material selection. For example, reducing a spectral width for a single channel may result in reduced interference from other bandwidths when sensing a particular bandwidth for the channel. Moreover, reducing a spectral width for a single channel may enable a greater density of channels for a multispectral filter, thereby enabling improved sensing for a particular device that includes a multispectral filter.

Figure 3C:
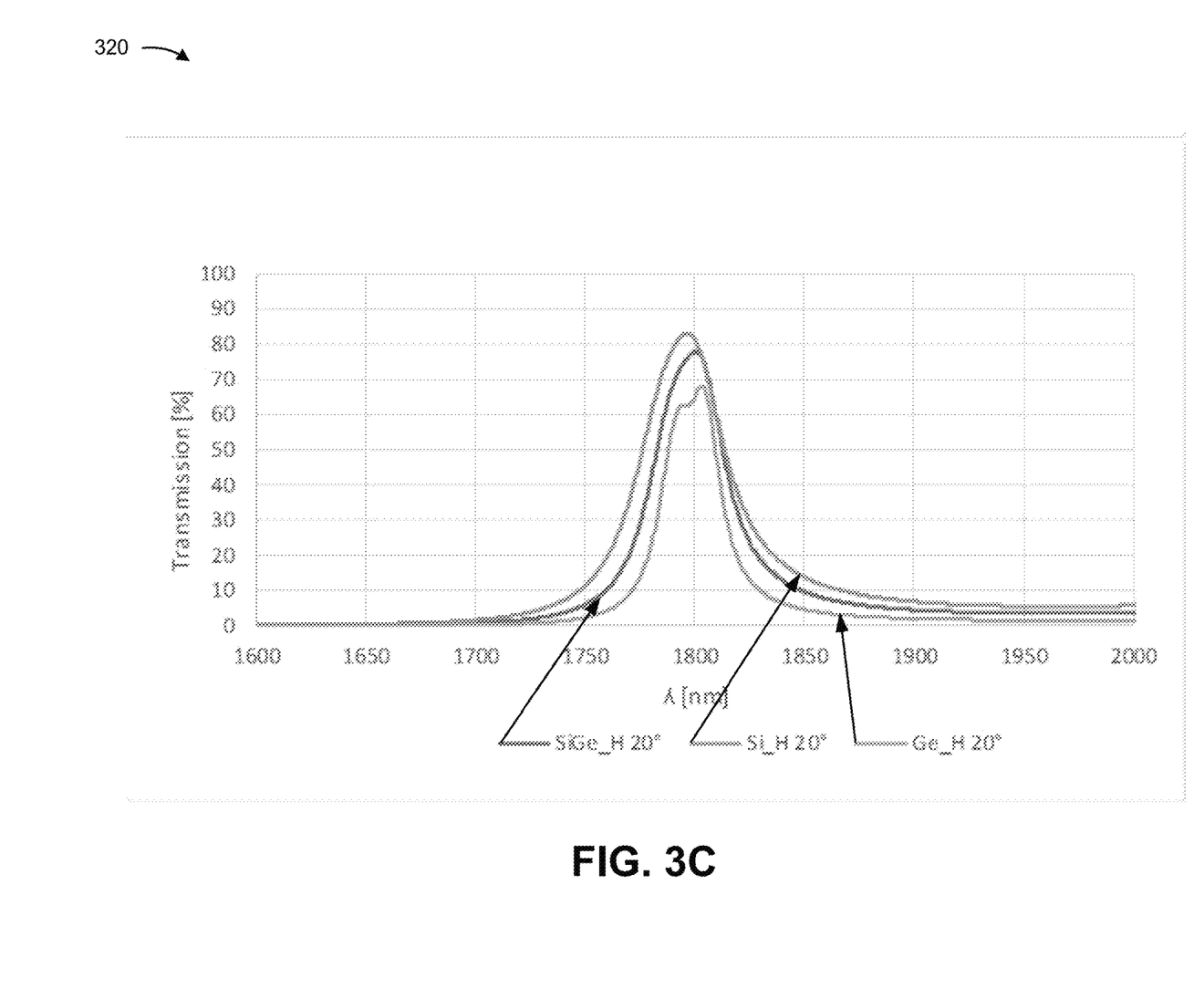

As shown in FIG. 3C, and by chart 320, a spectral bandwidth is determined for a channel at 1800 nm and at an angle of incidence of 20 degrees using a particular material for a high refractive index layer of a binary multispectral filter described herein. For example, for hydrogenated silicon based high refractive index layer a peak of approximately 82% transmissivity may be achieved, and a spectral width for 50% transmissivity may extend from 1775 nm to 1815 nm. In contrast, for a hydrogenated silicon germanium based high refractive index layer, a peak of approximately 78% transmissivity may be achieved, and a spectral width for 50% transmissivity may extend from 1780 nm to 1815 nm. In contrast, for a hydrogenated germanium based high refractive index layer a peak of approximately 68% transmissivity may be achieved, and a spectral width for 50% transmissivity may extend from 1785 nm to 1810 nm.

In this way, use of hydrogenated germanium may result in a narrower spectral width for a channel, thereby improving filter performance relative to another material selection. Moreover, use of hydrogenated silicon may result in an improved peak transmissivity at angles of incidence greater than a threshold, which may improve performance of the binary multispectral filter.

Furthermore, as shown in FIGS. 3B and 3C, use of hydrogenated germanium may result in a reduced angle shift as a result of an increase to an angle of incidence, thereby improving filter performance. For example, as shown in table 1:

TABLE 1

| AOI [°] | CWL Si [nm] | CWL Ge [nm] | shift Si [nm] | shift Ge [nm] |
|---|---|---|---|---|
| 0 | 1818.0 | 1815.8 | 0 | 0 |
| 20 | 1798.1 | 1799.2 | 20.0 | 16.6 |
| 30 | 1773.6 | 1778.2 | 44.4 | 37.6 | for a germanium (Ge) based design, relative to a Silicon (Si) based design for a multispectral filter, a center wavelength (CWL) shift value may be reduced at angles of incidence (AOI). For example, at an angle of incidence of 20 degrees, a center wavelength shift value may be reduced from 20.0 nm to 16.6 nm for germanium based designs relative to silicon based designs, and at an angle of incidence of 30 degrees, a center wavelength shift value may be reduced from 44.4 nm to 37.6 nm.

In this way, by reducing the angle shift for a multispectral filter, some implementations, described herein, may reduce interference from light received at a threshold angle of incidence, improve sensing of a particular wavelength of light, and may obviate a need for an aperture to control angle of incidence, thereby reducing a cost, a size, and/or the like of a device that includes a multispectral filter.

Figure 3D:
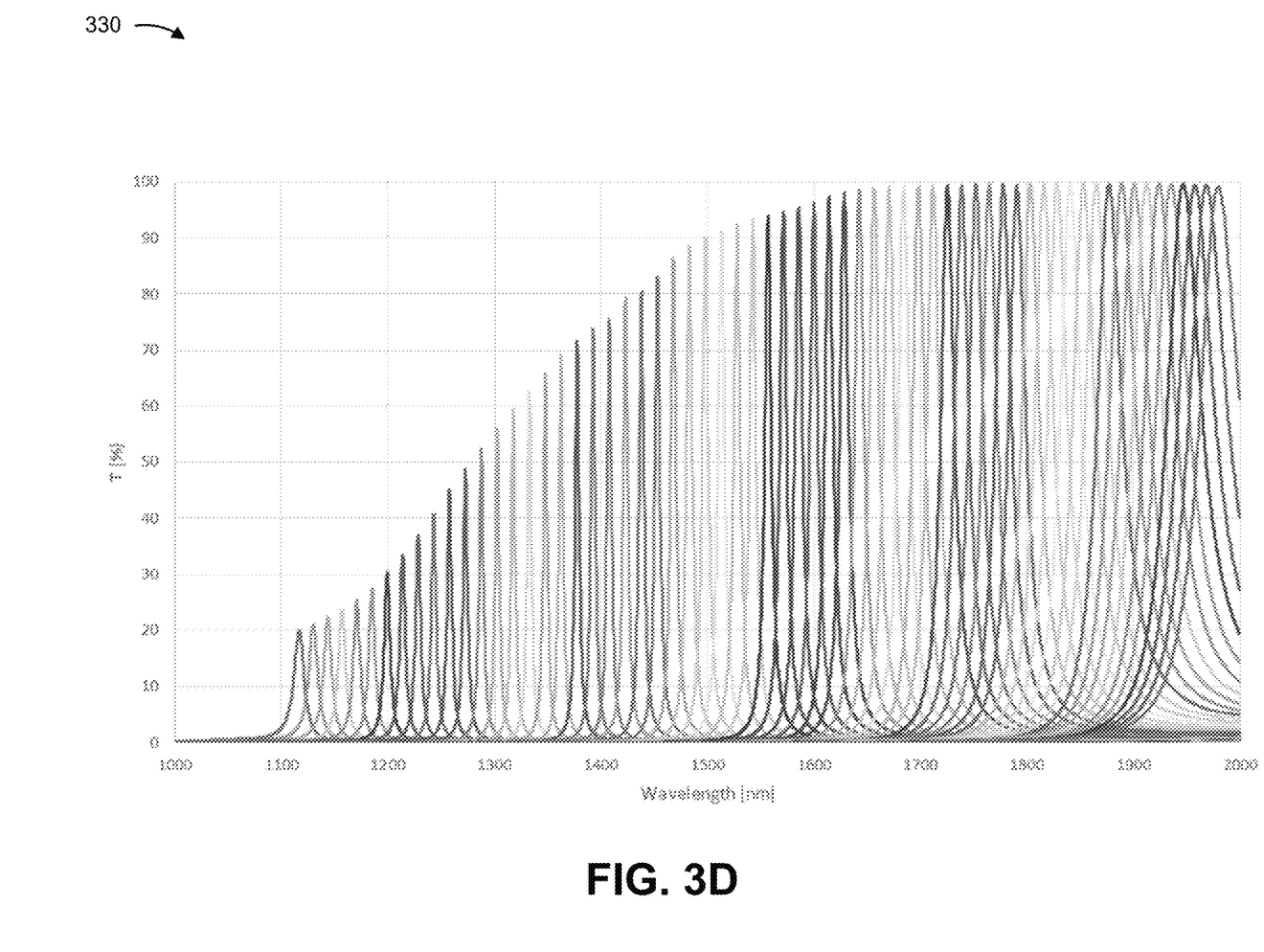

As shown in FIG. 3D, and by chart 330, a spectral bandwidth is determined, without accounting for quantum efficiency of a detector, for a 64 channel binary multispectral filter described herein. For example, the binary multispectral filter may use hydrogenated germanium as a high refractive index layer and may be associated with a set of 64 channels from 1100 nm to 2000 nm. In this case, a transmissivity of greater than 95% is achieved for channels at 1650 nm and higher, a transmissivity of 80% is achieved for channels at 1400 nm and higher, a transmissivity of 50% is achieved for channels at 1300 nm and higher, etc.

As shown, for channels at less than a threshold wavelength, such as less than 1300 nm, less than 1200 nm, and/or the like, less than a threshold transmissivity may be achieved using hydrogenated germanium as a high refractive index layer (e.g., less than approximately 70%, less than approximately 50%, less than approximately 30%, less than approximately 20%, and/or the like). As a result, a plurality of pixels (e.g., a plurality of sensor elements of a sensor element array) may be optically coupled to channels associated with less than a threshold wavelength and less than a threshold transmissivity to flatten a response of the binary multispectral filter. For example, relative to a channel at 1700 nm for which 1 pixel (e.g., 1 sensor element) is aligned, the binary multispectral filter may be associated with 5 aligned pixels (e.g., 5 sensor elements) for a channel at 1100 nm to ensure a flat response. In this way, differentiation in a quantity of pixels (e.g., sensor elements) aligned to each channel may ensure a flat response, thereby improving optical performance of an optical device that includes the binary multispectral filter.

As indicated above, FIGS. 3A-3D are provided merely as examples. Other examples are possible and may differ from what was described with regard to FIGS. 3A-3D.

In this way, a binary multispectral filter may be manufactured using a particular set of materials for a high refractive index layer (e.g., silicon germanium, germanium, hydrogenated silicon germanium, hydrogenated germanium, and/or the like). Based on using the particular set of materials, the binary multispectral filter may be associated with improved spectral width, reduced angle shift, reduced channel width, and/or the like relative to other materials, thereby improving sensing for an optical system that includes the binary multispectral filter.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. An optical filter with a set of layers, the optical filter comprising:
   a substrate;
   a first mirror,
      wherein the first mirror includes a first subset of layers of the set of layers;
   a second mirror,
      wherein the second mirror includes a second subset of layers of the set of layers; and
   a spacer,
      wherein the spacer includes a third subset of layers of the set of layers,
      wherein the set of layers includes a plurality of high refractive index layers associated with a first refractive index and a plurality of low refractive index layers associated with a second refractive index that is less than the first refractive index,
      wherein the plurality of high refractive index layers include one or more hydrogenated layers, and
      wherein the optical filter enables transmissivity in a spectral range from at least approximately 1200 nanometers (nm) to approximately 1900 nm.

2. The optical filter of claim 1, wherein the first subset of layers and the second subset of layers each includes at least one of the plurality of high refractive index layers and at least one of the plurality of low refractive index layers.

3. The optical filter of claim 1, wherein the optical filter forms a particular quantity of channels, and
   wherein the particular quantity of channels is greater than or equal to at least one of:
      32 channels,
      64 channels, or
      128 channels.

4. The optical filter of claim 1, wherein the plurality of low refractive index layers includes at least one of:
   a silicon layer,
   a silicon dioxide ($SiO_2$) layer,
   an aluminum oxide ($Al_2O_3$) layer,
   a titanium dioxide ($TiO_2$) layer,
   a niobium pentoxide ($Nb_2O_5$) layer,
   a tantalum pentoxide ($Ta_2O_5$) layer, or
   a magnesium fluoride ($MgF_2$) layer.

5. The optical filter of claim 1, wherein the first refractive index is greater than 3.0.

6. The optical filter of claim 1, wherein the second refractive index is less than 2.5.

7. The optical filter of claim 1, wherein the spectral range is from at least approximately 1000 nm to approximately 2000 nm.

8. The optical filter of claim 1, wherein the spectral range is from at least approximately 1100 nm to approximately 2000 nm.

9. The optical filter of claim 1, wherein the optical filter forms a plurality of channels associated with a plurality of wavelengths of light, and
   a first channel, of the plurality of channels, and a second channel, of the plurality of channels, are associated with a common wavelength of light of the plurality of wavelengths of light.

10. A binary multispectral filter, comprising:
    a plurality of layers,
    wherein the plurality of layers includes a set of high refractive index layers associated with a first refractive index and a set of low refractive index layers associated with a second refractive index that is less than the first refractive index,
    wherein the plurality of layers form a plurality of channels to direct a plurality of wavelengths of light,
    wherein the set of high refractive index layers include at least one of:
       a hydrogenated silicon germanium layer, or
       a hydrogenated germanium layer, and
    wherein the binary multispectral filter enables transmissivity in a spectral range of from approximately 1100 nanometers (nm) to approximately 2000 nm.

11. The binary multispectral filter of claim 10, wherein the binary multispectral filter is associated with a spectral range including a near-infrared spectral range and a short-wave infrared spectral range.

12. The binary multispectral filter of claim 10, wherein the plurality of layers sandwich a spacer layer, and
    wherein the spacer layer is associated with the first refractive index.

13. The binary multispectral filter of claim 10, wherein the plurality of layers are disposed onto a glass substrate or a silicon substrate.

14. The binary multispectral filter of claim 10, wherein, for each of the plurality of channels, a first transmissivity at a threshold angle of incidence is within a threshold percentage of a second transmissivity at a 0 degree angle of incidence.

15. The binary multispectral filter of claim 10, wherein, for each of the plurality of channels, a center wavelength at a threshold angle of incidence is within a threshold percentage of a second center wavelength at a 0 degree angle of incidence.

16. A system, comprising:
a set of optical sensors disposed in a substrate; and
a nnultispectra filter deposited on the substrate,
the nnultispectral filter including:
a first set of layers and a second set of layers sandwiching one or more spacer layers, wherein the first set of layers and the second set of layers include alternating high refractive index layers with a first refractive index and low refractive index layers with a second refractive index less than the first refractive index,
wherein a material, a thickness, and a quantity of the high refractive index layers and the low refractive index layers are selected to form a set of channels corresponding to the set of optical sensors and to cause a threshold spectral width for the set of channels,
wherein the high refractive index layers include one or more hydrogenated layers, and
wherein the one or more hydrogenated layers include at least one of:
a hydrogenated germanium layer, or
a hydrogenated silicon germanium layer, and
wherein the multispectral filter enables transmissivity in a spectral range from at least approximately 1200 nanometers (n m) to approximately 1900 nm.

17. The system of claim 16, wherein the system is at least one of: biometric system, a security system, a health monitoring system, an object identification system, or a spectroscopic identification system.

18. The system of claim 16, wherein a quantity of channels, in the set of channels, is greater than or equal to 32 channels.

* * * * *